United States Patent Office 3,844,988
Patented Oct. 29, 1974

3,844,988
TRIACETYL CELLULOSE RESIN FILMS
Haruo Takenaka, Mitsuo Okajima, Nobuo Hiratsuka, and Yasuaki Yuyama, Kanagawa, Japan, assignors to Fuji Photo Film Co., Ltd., Kanagawa, Japan
No Drawing. Continuation-in-part of application Ser. No. 186,809, Oct. 5, 1971, which is a continuation of application Ser. No. 56,077, June 29, 1970, which in turn is a continuation of application Ser. No. 653,047, July 13, 1967, all now abandoned. This application July 9, 1973, Ser. No. 377,347
Int. Cl. C08b 21/08; C08g 41/04
U.S. Cl. 260—16
7 Claims

ABSTRACT OF THE DISCLOSURE

By incorporating in a triacetyl cellulose resin film having a combined acetic acid content of more than 58% a polyurethane resin soluble in methylene chloride and having a molecular weight of above 5,000 and only OH groups as the terminal groups thereof, the folding endurance and tear resistance of the film are substantially improved.

CROSS-REFERENCE TO RELATED APPLICATIONS

The present application is a continuation-in-part of U.S. application Ser. No. 186,809 entitled "Triacetyl Cellulose Resin Films" in the names of Haruo Takenaka et al., filed Oct. 5, 1971, which is, in turn, a continuation of U.S. application Ser. No. 56,077, filed June 29, 1970, which is, in turn, a continuation of U.S. application Ser. No. 653,-047, filed July 13, 1967, all of which prior applications are now abandoned.

BACKGROUND OF THE INVENTION

Field of the Invention

The present invention relates to an improved triacetyl cellulose resin film and particularly to a triacetyl cellulose resin film having excellent folding endurance and tear resistance properties.

Description of the Prior Art

Owing to their excellent transparency and luster and particularly excellent uniformity of thickness, triacetyl cellulose resin films have been used as supports for photographic light-sensitive materials, supports for magnetic recording tapes, printing materials and the like.

However, conventional triacetyl cellulose resin films suffer from the disadvantages that their tear resistance and folding endurance properties are low. In particular, under low humidity conditions, the films become very hard and brittle and are easily splittable. Also, when using such films as packing films for clothing and the like, the films become brittle, splittable and finally are broken under low humidity conditions, while under high humidity conditions, the films adhere to each other and become unusable. Further, the films are hard and stiff and because of their inflexibility are unsuitable for packing materials at normal temperatures.

U.S. Pat. No. 3,054,673 discloses a non-curling cellulose ester film, having in the film a low molecular weight (about 850) polymer as a plasticizer. Typical cellulose esters include cellulose acetate with a 60% combined acetic acid content, while the polymer (i.e., plasticizer) comprises esters of a glycol or a polyglycol with at least one dibasic acid and at least one monobasic acid, the latter constituting the terminal groupings of the polymer. A typical polyester is made of 2 moles of azelaic acid, 2 moles of pelargonic acid and 3 moles of ethylene glycol. However, such a film has a low folding endurance and tear resistance, and adheres to itself at high temperature.

U.S. Pat. No. 2,948,691 relates to polyether urethane polymers useful as plasticizers for plastics such as cellulose triacetate. Normally, polymers useful as plasticizers have a molecular weight of from about 1,000 to 5,000, with polymers having a molecular weight of above 5,000 not being classified as plasticizers since, taking cellulose triacetate as an example, such polymers cannot be melted, and thereby mixed, together with cellulose triacetate.

The polyether urethanes disclosed in U.S. Patent No. 2,948,691 are prepared by reacting polyglycolethers of a molecular weight (MW) of at least 500 which have at least two terminal hydroxyl groups with mono- or polyfunctional aliphatic or aromatic isocyanates, resulting in a compound of the formula O=C—N—R—N—C=O, wherein R is the polyglycolether residue.

Such low MW (less than 5,000) polymers, when incorporated in a triacetyl cellulose resin films, do not provide the films with sufficient folding resistance, tear resistance and adhesion properties.

SUMMARY OF THE INVENTION

The inventors have found that the aforesaid drawbacks are obviated by providing a strong triacetyl cellulose film having high folding endurance and high tear resistance properties as well as excellent permeability at normal temperatures and at a low humidity. These compositions are provided by mixing a polyurethane resin having a MW of above 5,000 and only OH groups as the terminal groups thereof, which is soluble in methylene chloride, with a triacetyl cellulose resin having a combined acetic acid content of more than 58%.

DETAILED DESCRIPTION OF THE INVENTION

If the combined acetic acid content of the acetyl cellulose is less than 58%, the folding endurance and the tear resistance properties of the film are not increased by the addition of the high MW polyurethane resin. Also the transparency and luster of the film are markedly lowered, which makes the film impractical for normal use.

The inventors also investigate other cellulose resins, however, it was impossible to obtain satisfactory films. As a result of various investigations, the inventors found that a high MW polyurethane rubber soluble in methylene chloride is suitable for obtaining triacetyl cellulose films having the aforesaid properties.

The particular polyurethane resin used in the present invention is not critical, as long as the MW of the polyurethane is above 5,000 and the polyurethane has only OH groups as the terminal groups thereof. A preferred polyurethane has the structure:

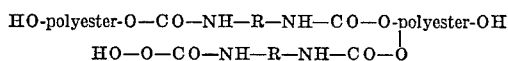

Where R represents a diisocyanate parent nucleus. The term parent nucleus denotes an atomic group other than the isocyanate groups in the diisocyanate compound recited therein. As the diisocyanate, there can be illustrated, for example, 2,4- or 2,6-tolylenediisocyanate, 3,3'-bitolylene-4,4'-diisocyanate, diphenylmethane - 4,4' - diisocyanate, 3,3' - dimethyldiphenylmethane-4,4'-diisocyanate, 2,4-tolylenediisocyanate dimer, and the like.

In addition, specific examples of R include an alkylene group, a benzene ring, a naphthalene ring and derivatives thereof. Most preferred of the alkylene groups represented by R are those which have from 1 to 3 carbon atoms. These are not, however, limitative, merely preferred.

The derivatives which can be used as the diisocyanate parent nucleus are not especially limited in the present invention, and various R groups as identified above can be modified with success. Representative of the derivatives are those represented by the formulae:

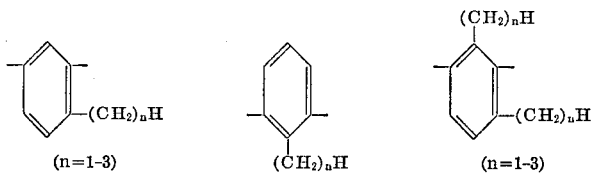

These compounds are well known and are described in detail in, for example,"Polyurethane," compiled by the Technical Head Office of Bridgestone Tire Co., Ltd., et al. (published by Maki Shoten, on Mar. 11, 1960).

The "polyester" in the above structure is a material obtained by the reaction between

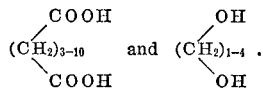

Various polyesters can be obtained by changing the combination of materials. The preferred polyester is polyethylene adipate.

Preferred polyurethanes are commercially available as "Desmocole 176" or "Desmorin N," both sold by Bayer A.G., having molecular weights of 7,000 and 10,000, respectively, wherein the "polyester" is polyethylene adipate.

Generally, the polyurethanes of the present invention are derived by reacting any mono- or poly-functional isocyanate with any polyester having a MW of 900 to 3,000, as long as the product has a MW of at least 5,000 and the polyurethane has only OH groups as the terminal groups thereof.

As already indicated, the important parameter in the present invention is the minimum molecular weight of the polyurethane. The maximum molecular weight is not particularly limited, and the invention should not be construed as restricted to any maximum value. However, considering the most important commercial uses of the material in the present invention, the maximum molecular weight is preferably about 30,000.

Desmocole 176 is similar in chemical structure to desmorin N, and both may be termed a "isocyanate modified-hydroxyl group containing-saturated polyester." The molecular weight, measured by the VPO process, of Desmocole 176 is about 7000 while the molecular weight of Desmorin N is about 10,000. The chemical structure of these compounds may be represented as follows:

is an ethyl acetate solution containing 70% by weight of triisocyanate obtained by the reaction of 3 moles of tolylene-diisocyanate and 1 mole of trimethylolpropane. The chemical structure of the triisocyanate compound is as follows:

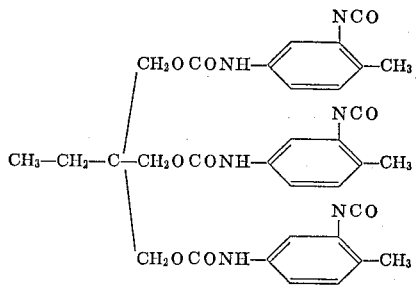

The characteristics of Nippoly-L-75 are as follows:

| | |
|---|---|
| Appearance | Yellowish transparent solution having high viscosity. |
| NCO content | 13.2±0.5% by weight. |
| Solid part | 75±1% by weight. |
| Free TDI | Less than 0.5% by weight. |
| Viscosity (25° C.) | 1500±300 cs. |
| Specific gravity | 1.17±0.01 $D_4^{25}$ |

Still further, Desmophene 2200 may be identified as a polyester adipate having a molecular weight of about 2000 and also having the following characteristics:

| | |
|---|---|
| OH value | 55–65 |
| OH content | 1.7–2.0 |
| Acid value | <2 |
| Water content | 0.15% |
| Specific gravity | 1.18 |
| Viscosity cp. 75° C. | 925–1075 |

Desmophene 1100 may be identified as a polyester adipate having a molecular weight of about 1000 and the following characteristics:

| | |
|---|---|
| OH value | 205–221 |
| OH content | 6.2–6.7 |
| Acid value | <4 |
| Water content | 0.15% |
| Specific gravity | about 1.12 |
| Viscosity cp. 75° C. | 300+40² |

"Elastosan 455," commercially available from Thiokol Chemical Co., may also be employed as the polyurethane of the present invention. "Elastosan 455" has a MW

```
HO ... Polyester...... O—CO—NH—R—NH—CO—O ....   Polyester   OH
     .
     OH                                                      O
                   Molecular weight                          CO
                   (measured by VPO process)                 NH
Desmocole 176..........          7,000                       R
Desmolin N.............         10,000                       NH
                                                             CO
                                                             O .....   OH
                                                                 .
                                                                OH
```

The above-identified polyester is polyethylene adipate.

Other similar materials are Nippoly-L-75, Desmophene 2200 and 1100 and Elastosan 455. Nippoly-L-75 similar to "Desmocole 176" or "Desmorin N" and is a milling-type mixture of methyl diisocyanate and polyester adipate.

Additional polyurethane resins used with excellent effect in the present invention include:

①

HOOC—(CH₂)₄—COOH + HO—(CH₂)₂—OH ⟶
adipate acie (1 mol)    ethylene glycol
                        (0.9 mol)

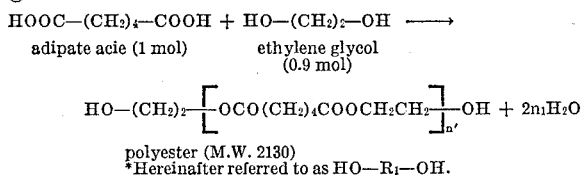

polyester (M.W. 2130)
*Hereinafter referred to as HO—R₁—OH.

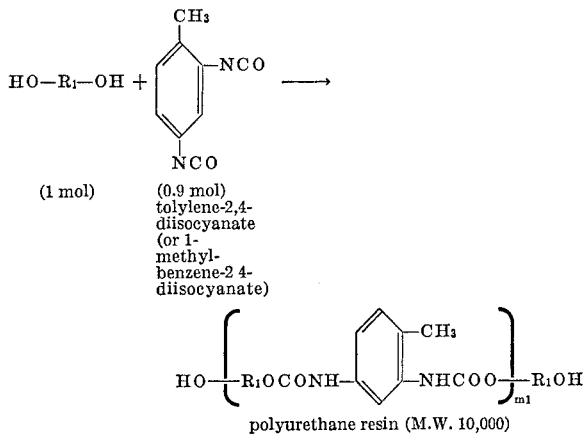

polyurethane resin (M.W. 10,000)

②

HOOC—(CH₂)₄—COOH + HO—(CH₂)₂—OH ⟶
adipic acid (1 mol)    ethylene glycol
                       (0.8 mol)

HO—R₂—OH + 2n₂H₂O
(M.W. 920)

(R₂ represents a group corresponding to R₁ wherein n₁ is changed to n₂.)

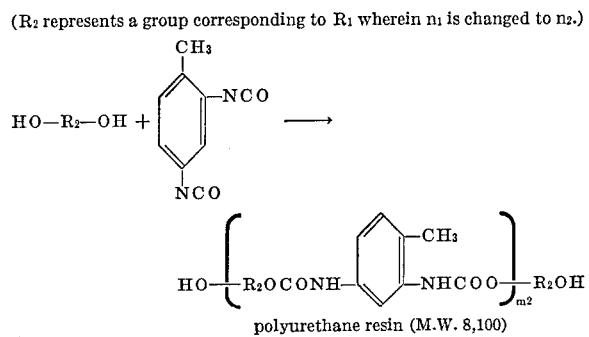

polyurethane resin (M.W. 8,100)

③

HOOC—(CH₂)₅—COOH + HO—(CH₂)₂OH    HO—R₃—OH + 2n₃H₂O
pimelic acid (1 mol)   ethylene glycol   (M.W. 1,740)
                       (0.75 mol)

(R₃ represents a group corresponding to R₁ wherein n₁ is changed to n₃.)

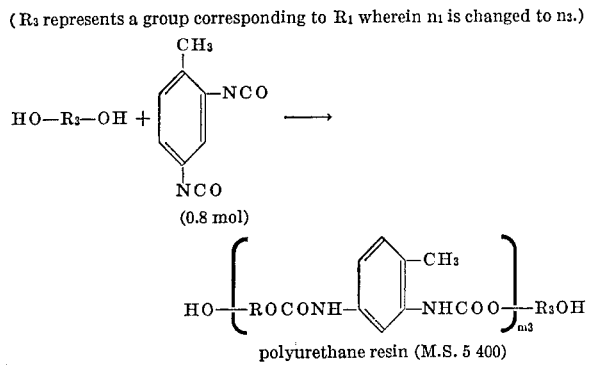

polyurethane resin (M.S. 5 400)

This last polyurethane, at varying molecular weights, was used as the X, Y and Z polyurethane resin in Example 3.

Polyurethane resins are, in general, produced by mixing a polyester resin and a diisocyanate in the absence of an organic solvent, adding thereto a catalyst such as tin oleate in amount of 0.1 to 2.0% by weight and heating the mixture to 100–150° C. for about 1–10 hours to react.

Many polyurethanes and the processes for producing the same are known, any of which can properly be utilized for the present invention so long as they meet the criteria set forth in this specification.

The amount of the polyurethane resin incorporated in the triacetyl cellulose resin is preferably less than about 200 parts by weight and is most preferably from 10 parts to 50 parts by weight per 100 parts by weight of the triacetyl cellulose resin.

Thus, by the present invention, films are obtained having a high folding endurance and which are not splittable when flexed at a low humidity. Moreover, such films may be made non-adherent by incorporating therein a plasticizer. They have a high flexibility at high humidity. Also, the triacetyl cellulose resin films of this invention are not characterized by a transfer or migration of materials within the films, are transparent and lustrous, and can be suitably used as general packing materials.

When the triacetyl cellulose resin film of this invention is used as, for example, a cinefilm support, the durability against long run projections is increased. When used as sheet films, the ease of handling is high.

The invention will be further explained by referring to the following non-limiting examples.

EXAMPLE 1

Into 100 parts by weight of a triacetyl cellulose resin having a combined acetic acid content of 61.5% and a polymerization degree of 260 was incorporated 50 parts by weight of a polyurethane resin, Desmocole 176 (made by Bayer A.-G.), having a MW of 7,000.

The polyurethane resin was completely dissolved in methylene chloride by mixing the mixture thereof for about 10 hours in a mixer, to provide a 20% solution of the polyurethane resin. The viscosity was 680 poises. The triacetyl cellulose resin had preliminarily been adjusted to a 15% dope of in a 90:10 wt. ratio solution of methylene chloride and methanol.

The mixed dope of the triacetyl cellulose resin and the polyurethane resin was spread by means of a casting machine. The film thus formed was stripped after pre-drying, and the film was dried from the opposite surfaces to provide an excellent film having a thickness of 190 microns.

The properties of the film were compared with those of a conventional film which is normally used as a support for photographic light-sensitive materials, the results of which are shown in Table 1. The conventional film was pure triacetyl cellulose obtained by omitting urethane from the sample in Example 1.

TABLE 1

| | Conventional film | Film of this invention |
|---|---|---|
| Folding endurance at normal temp. and normal humidity (20° C., 60% RH) | 22 | 70 |
| Tear resistance at normal temp. and normal humidity (20° C., 60% RH) | 46 | 100 |
| Folding endurance at normal temp. and low humidity (20° C., 10% RH) | 15 | 72 |
| Tear resistance at normal temp. and low humidity (20° C., 10% RH) | 15 | 46 |

NOTE.—RH stands for relative humidity.

As is clear from Table 1, the films of this invention have excellent folding endurance and tear resistance properties at a normal humidity as well as at a low humidity, as compared to the conventional film.

EXAMPLE 2

Into 100 parts of a triacetyl cellulose resin having a combined acetic acid content of 60.4% and a polymerization degree of 370 were incorporated 40 parts of dimethyl-terephthalate and 10 parts of Desmocole 176, as a polyurethane resin (MW=7,000).

The polyurethane resin was dissolved in methylene chloride by mixing the mixture thereof for about 10 hours in a mixer to provide a 1.5% solution of the polyurethane resin. Its viscosity was 54 poises. The triacetyl cellulose resin had preliminarily been adjusted to a 15% dope in a 90:10 wt. ratio methylene chloride-methanol solution.

The mixed dope of the triacetyl cellulose resin and the polyurethane resin was spread by means of a casting machine. The film thus formed was stripped after pre-drying, and dried from the opposite surfaces to provide an excellent film of 70 microns in thickness. The film thus obtained was compared with a conventional packing film. The conventional packing film was pure triacetyl cellulose obtained by omitting urethane from the sample in Example 1. The results are shown in Table 2.

TABLE 2

|  | Conventional film | Film of this invention |
|---|---|---|
| Folding endurance at 20° C., 60% RH | 350 | >2,000 |
| Tear resistance at 20° C., 60% RH | 20 | 30 |
| Folding endurance at 20° C., 10% RH | 90 | 424 |
| Tear resistance at 20° C., 10% RH | 18 | 27 |
| Adhesion at 20° C., 60% RH (1 kg./cm.³) | D | A |
| Adhesion at 35° C., 85% RH (1 kg./cm.³) | E | A |

Example 3

This example shows the difference between polyurethanes having a MW of below and above 5,000 as used in the present invention. Three separate films were prepared by coating and drying a mixture of 15.6 gms. of cellulose triacetate (combined acetic acid content: 60.4%; polymerization degree: 370), 73.1 gms. of methylene chloride, 6.4 gms. of methanol, 2.5 gms. of cyclohexane and 2.4 gms. of the polyurethanes indicated in Table 3 below. The properties of each film were measured and the results are shown in Table 3.

TABLE 3

| Run number | 1 | 2 | 3 |
|---|---|---|---|
| Property: |  |  |  |
| Folding endurance: |  |  |  |
| 20° C., 60% R.H. | 420 | 460 | 869 |
| 20° C., 10% R.H. | 120 | 140 | 294 |
| Tear resistance: |  |  |  |
| 20° C., 60% R.H. | 21 | 22 | 29 |
| 20° C., 10% R.H. | 19 | 20 | 29 |
| Adhesion (1 kg./cm.³): |  |  |  |
| 20° C., 60% R.H. | B | B | A |
| 35° C., 85% R.H. | C | B | A |
| Polyurethane ¹ | X | Y | Z |
| MW | 1,000 | 3,000 | 7,300 |

¹ X, Y, Z: As polyurethane X, Y or Z, polyurethane resin three described hereinbefore having a mean molecular weight of 1,000, 3,000, or 7,300, respectively, was used.

As is clear from Table 3, the higher molecular weight polyurethane incorporated into the films of this invention provided significantly higher folding endurance and tear resistance properties and the films showed no adhesion to each other even at high temperature and high relative humidity and had excellent transparency and luster.

Folding endurance in all instances was measured by ASTM-D-624 (MIT Method-folding endurance test).

The tear resistance in all instances was measured by ASTM-D-624 (Elmendorf tear test).

In the adhesion tests, ten sheets of films of 10 cm. x 10 cm. were superimposed and after applying a load of 2 kg., the sheets were allowed to stand for 24 hours in an atmosphere at 35° C. and 85% relative humidity. If no adhesion occurred by the test, the film was ranked "A," if the whole surface adhered, the film was ranked "E," and the ranks between "A" and "E" were equally divided into three ranks, "B," "C" and "D."

Example 4

100 parts by weight (0.9 mol) of adipic acid and 47 parts by weight (1.0 mol) of ethylene glycol were mixed together with 200 parts by weight of a solvent (nitrobenzene). Then, the resulting mixture was heated to 160-170° C. for about 8 hours to prepare a polyester resin. The thus obtained polyester resin had a mean molecular weight of 2130.

1000 parts by weight of the above-described polyester resin was reacted with 74 parts by weight of 2,4-tolylenediisocyanate (the molar ratio of OH groups of the polyester resin to NCO groups of 2,4-tolylenediisocyanate was 1:0.9) to synthesize a polyurethane resin. Reaction was conducted at 120° C. for 4 hours in the presence of tin oleate as a catalyst in a proportion of 0.5% by weight based on the total weight of polyester and diisocyanate.

50 parts by weight of the thus obtained polyurethane resin and 100 parts by weight of cellulose triacetate having a combined acetic acid content of 61.5% and a polymerization degree of 260 were dissolved in 1000 parts by weight of methylene chloride. The resulting mixture was cast on a smooth metal plate to produce a film having a thickness of 100μ.

The tear resistance and the folding endurance of the resulting film were measured, the results of which are shown below. In addition, as a comparative example, a film was produced in the same manner except for using the above-described cellulose triacetate alone.

| Test | Measuring method | Sample obtained in Example 3, g. | Comparative sample, g. |
|---|---|---|---|
| Tear resistance | ASTM D-624 | 110 | 46 |
| Folding endurance | ASTM D-643 | 80 | 22 |

As can be seen from the results given in the above Table, the sample in accordance with the present invention provided far superior results in both tests as compared with the comparative sample.

While the invention has been described in detail and with reference to specific embodiments thereof, it will be apparent to one skilled in the art that various change and modifications can be made therein without departing from the spirit and scope thereof.

What is claimed is:

1. A triacetyl cellulose resin film having increased tear resistance and folding endurance consisting essentially of a triacetyl cellulose resin having a combined acetic acid content of at least 58% and a polyprethane resin soluble in methylene chloride having a molecular weight of at least 5,000 and only OH groups as the terminal groups thereof.

2. The film of Claim 1 wherein the polyurethane is represented by the formula:

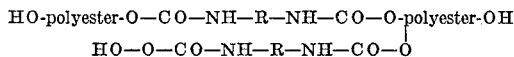
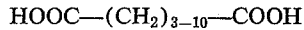
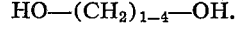

wherein R represents a diisocyanate parent nucleus and wherein the polyester is one obtained by the reaction between $$HOOC-(CH_2)_{3-10}-COOH$$

and $$HO-(CH_2)_{1-4}-OH.$$

3. The film of Claim 2 wherein the polyester is polyethylene adipate.

4. The film of Claim 1 wherein the polyurethane is present in an amount of less than about 200 parts by weight based on the weight of 100 parts of the triacetyl cellulose resin.

5. The film of Claim 1 wherein the polyurethane is present in an amount of from 10 to 50 parts by weight per 100 parts by weight of the triacetyl cellulose resin.

6. The film of Claim 1 wherein the polyurethane is a reaction product of a mono- or poly-functional isocyanate with a polyester having a molecular weight of from 900 to 3,000.

7. The film of Claim 1 wherein the polyurethane has a molecular weight of at least 5,000 up to about 30,000.

References Cited

UNITED STATES PATENTS

| | | | |
|---|---|---|---|
| 2,231,890 | 2/1941 | Esselman et al. | 28—1 |
| 2,675,360 | 4/1954 | Caldwell | 260—13 |
| 2,948,691 | 8/1960 | Windemuth et al. | 260—2.5 |
| 3,054,673 | 9/1962 | Bostwick | 96—87 |
| 3,213,046 | 10/1965 | Harrington et al. | 260—13 |

WILLIAM SHORT, Primary Examiner

E. A. NIELSEN, Assistant Examiner

U.S. Cl. X.R.

96—87; 106—186; 260—13, 33.8 U

UNITED STATES PATENT OFFICE
CERTIFICATE OF CORRECTION

Patent No. 3,844,988　　　　　　　　　Dated　October 29, 1974

Inventor(s) Haruo Takenaka et al

It is certified that error appears in the above-identified patent and that said Letters Patent are hereby corrected as shown below:

IN THE HEADING:

The claimed Priority Data was omitted. Should read:

--July 13, 1966　　　Japan.........45817/66--

Signed and sealed this 18th day of February 1975.

(SEAL)
Attest:

RUTH C. MASON
Attesting Officer

C. MARSHALL DANN
Commissioner of Patents
and Trademarks